(12) United States Patent
Becker et al.

(10) Patent No.: US 6,513,040 B1
(45) Date of Patent: Jan. 28, 2003

(54) METHOD AND APPARATUS FOR A MODEL DATA STRUCTURE FOR ACCESSING AND MANIPULATING JAVA BEANS

(75) Inventors: Craig Henry Becker, Austin, TX (US); John Andrew Cook, Austin, TX (US); Troy Douglas Folger, Round Rock, TX (US); James Irwin Knutson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/968,719

(22) Filed: Nov. 12, 1997

(51) Int. Cl.[7] ............................................. G06F 17/30
(52) U.S. Cl. .................. 707/10; 707/103 R; 707/103.4; 707/103.103 Z; 707/103; 395/701; 395/200; 395/682; 345/333; 345/334; 345/340; 345/348
(58) Field of Search .......................... 707/103, 10, 203, 707/204, 103 R, 103 Y, 103 Z

(56) References Cited

U.S. PATENT DOCUMENTS 5,706,502 A * 1/1998 Foley et al. .................. 707/10
5,842,020 A * 11/1998 Faustini ...................... 395/701
5,862,325 A * 1/1999 Reed et al. .................... 707/10
5,873,097 A * 2/1999 Harris et al. ................. 395/200

* cited by examiner

Primary Examiner—Wayne Amsbury
Assistant Examiner—Thu-Thao Havan
(74) Attorney, Agent, or Firm—David A. Mims, Jr.

(57) ABSTRACT

A method and apparatus for a general container mechanism for storage of object-oriented Java Beans. A repository is created for a persistent collection of items called Managed-Beans. Each ManagedBean contains a structured collection of code and data that makes up a Java Bean. The structured collection consists of items called ManagedBean Elements (MBE) which correspond to different types of code and data. Each ManagedBean Element is a subclass of the generic ManagedBean Element class. Each subclass identifies the different kinds of Bean sub-elements and contains the data contained in the corresponding file, and method that works on this data.

15 Claims, 4 Drawing Sheets

METHOD AND APPARATUS FOR A MODEL DATA STRUCTURE FOR ACCESSING AND MANIPULATING JAVA BEANS

CROSS REFERENCE TO RELATED APPLICATIONS

This application is related in subject matter to the following application filed concurrently herewith and assigned to a common assignee:

Application Ser. No. 08/968,720 filed by Craig Becker, John Cook, Troy Folger and Jim Knutson entitled, "Method and Apparatus For Extending A Java Archive File".

The foregoing co-pending application is incorporated herein by reference.

FIELD OF THE INVENTION

The present invention relates to data processing systems, and more particularly, to a methodology and structure for accessing individual elements of an archived object-oriented object.

BACKGROUND OF THE INVENTION

Over the past few years, constructing applications by assembling reusable software components has emerged as a highly productive and widely accepted way to develop custom applications. First generation products such as Microsoft's Visual Basic, with its VBX components and "forms-based" applications assembly process proved to be very useful in building a broad spectrum of applications. Visual Basic has been followed by other products such as Borland's Delphi, which further enhanced the basic component assembly application development model by adding more powerful data access components and object-oriented component extension capabilities.

The release of a windowing system, Internet protocol and platform independent product named Java represented an even further advance. Java represents an object-oriented language which satisfies the public's desire to animate and add dynamism to the static web pages of the Internet. More importantly, Java's platform independence levels the playing field for software vendors, enabling them to escape the dominance of a single supplier. Java permits writing to a virtual platform which is installed on most desktop web browsers. System managers have quickly recognized the advantage of a single master copy of programs that are stored in one place, ideal for easy update, that downloads to the client for the duration of the session, thus exploiting the users desktop processor in a client/server model but without the client side maintenance and version control costs. For details and background with respect to the Java System, reference may be made to a typical text, "Just Java", 2nd Edition, Peter van der Linden, Sun Microsystems, 1997.

More recently, the introduction of Java Beans has taken the component software assembly paradigm to a new level. Java Beans is an architecture and platform-neutral Application Programming Interface (API) for creating and using dynamic Java components. Java Beans and their common properties and functions are described in detail in the text, "Java" in a "Nutshell", 2nd. Edition, David Flanagan, O'Reilly and Assoc. Inc., 1997. Java Beans enhance the Java platform by allowing richer, more dynamic interaction. Java Beans allow developers to define independent components that can be used and re-used in a variety of combinations to compose new applications inside a variety of browser and non-browser environments. Java Beans components can be GUI widgets, non-visual functions and services, applets and more full-scale applications. Each of these components can be built by different developers at separate times. Java Beans components do not need to be part of the same application build because they are capable of communicating dynamically.

Java employs a platform independent file format that concatenates and compresses many Java class, image and audio files into one file called a JAR (Java ARchive) file. One of the main attributes of the JAR file design is to reduce the number of HTTP (HyperText Transfer Protocol) connections that need to be opened, thus reducing download times. Each entry in a JAR file can be individually digitally signed for authentication, if desired. The file format is the popular ZIP format and can be used as a general archiving tool. Java Beans can be moved around in "bulk" using the JAR file.

However, some applications require the ability to manipulate Java Beans with a finer granularity. For example, an interactive Java Bean development environment needs to be able to examine, add, change or delete individual elements that make up a Java Bean. Builder tools, for example, need to compose Customizer classes for the Java Beans. Other tools need to create icons or other data for the beans. Translation services will wish to add translated or locale-specific property files associated with the Java Bean. For some customers, the source code of the Java Bean might be included within the JAR file. Consequently, it would be desirable to provide a methodology and structure for examining, adding, changing, deleting, etc. the elements constituting a Java Bean.

SUMMARY OF THE INVENTION

This invention relates to a method and structure for a general container mechanism for storage of Java Beans. A repository is created for a persistent collection of items called ManagedBeans. Each ManagedBean contains a structured collection of code and data that makes up a Java Bean. The structured collection consists of items called ManagedBean Elements (MBE) which correspond to different types of code and data. Each ManagedBean Element is a subclass of the generic ManagedBean Element class. Each subclass identifies the different kinds of Bean subelements and contains the data contained in the corresponding file, and the methods that work on this data. All MBEs provide standard operations, such as obtaining the type of element, obtaining the object in a polymorphic manner, writing the object to a repository, revising the object in a repository, changing properties of the object, and changing the association of the Managed Bean from one repository to another. In addition, each subclass provides operations that allow for the return of the element as a live Java object, in the same manner that a handle or object reference class returns an object instance.

DETAILED DESCRIPTION OF THE EMBODIMENTS

This invention provides methodologies and structures for a general container mechanism for storing a persistent collection of items forming a Java Bean. A Java Bean, or just Bean, consists of one or more files, each containing compiled Java code or data, that is associated with the Java Bean. A Bean is a software component which can be visually manipulated in development environments. Beans provide an effective way of creating Java applets and applications. In addition, Bean components can be created which are as complex as existing applications, like a spreadsheet or as simple as a button on a GUI. This invention permits the individual file elements of a Java Bean to be easily examined, changed, deleted, modified, etc.

Figure 1:
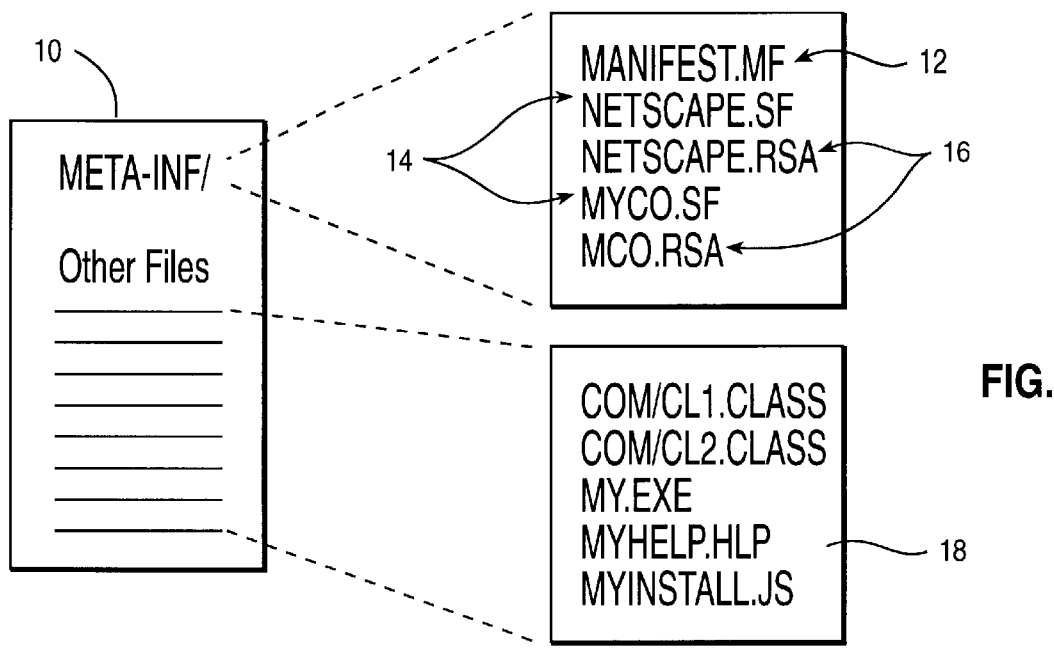
FIG. 1 illustrates the format for a Java Archive file.

Java Beans are typically distributed and installed in a development environment by packaging them in a JAR (Java Archive) file. These files are essentially ZIP files that are created using a JAR utility. The current use of the JAR file as a repository is not the only type of repository of Java Beans anticipated by this invention. When Beans are shipped as part of a JAR file, the term Bean may also refer to a serialized version of the Bean which is used to instantiate the Bean. Referring to FIG. 1, there is shown the format for a JAR file. The JAR file has a subdirectory of meta-information named META-INF 10. The subdirectory 10 contains a single manifest file named MANIFEST.MF 12. The MANIFEST.MF 12 file contains arbitrary information about the files in the archive, such as their encoding or language. The JAR file is also capable of containing zero or more signature files named name.SF 14. There is one of these files for each entry that has signed files in the archive. In addition, the JAR file may contain zero or more digital signature files named name.suf 16, where the suffix (e.g., RSA) is determined by the digital signature format. There is at least one of these files for each signature instruction file.

In addition to the MANIFEST.MF 12 subdirectory, the archive contains whatever files 18 a user wishes to package in the archive, such as files to be installed for an automatic software installation feature.

Alternatively stated, the syntax of the JAR command is: JAR CFM <jar file> <manifest file> <bean files>. The <jar file> parameter specifies the JAR file to create, for example, AlarmBean.jar. The <manifest file> parameter specifies a partial manifest file, for example, AlarmBean.manifest. The <manifest file> parameter specifies which of the stored class files is actually the bean. The <file name> portion of the file specifies the actual class file.

There are well known current elements associated with a Java Bean. In Java programming, as in many forms of object-oriented programming, tools need to be able to hold handles or persistent references to entities without requiring that the actual entities be present. It is of great help to the programmer or user of the tools, if the operations to inspect and recover the entities are polymorphic: that is, if they do not depend heavily on the type of the entity. This invention provides programmers and tool writers with a polymorphic means to handle the many different items associated with a Java Bean.

Additionally, in Java programming, it is a great help to the programmer or user of the tools, if there are simple means for adding a new item into a JAR file, removing an item from a JAR file, or updating an item's contents or properties. During application development, the tasks of adding new serialized versions of Java Beans, or updating a Customizer or Bean Info class, or adding a complete new Java Bean with its supporting elements are common. This invention provides programmers and tool writers with a regular set of tools to handle these problems, including those with object-oriented attributes with polymorphic control over insert, delete, or update.

Figure 2:
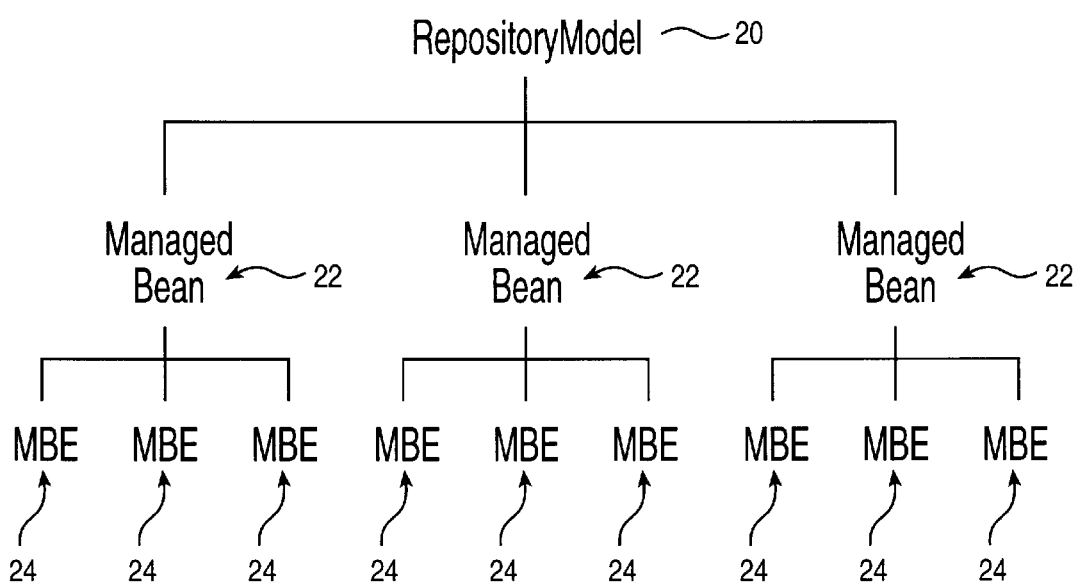
FIG. 2 is a general container structure for storing Java Beans as disclosed by this invention.

Referring now to FIG. 2, there is shown a general container mechanism of this invention for Java Beans called a repository 20. The repository 20 is a persistent collection of items called ManagedBeans 22. Each ManagedBean 22 contains a structured collection of code and data that makes up a Java Bean. This structured collection consists of items called ManagedBean Elements 24 which correspond to different types of code and data. The repository model 20 represents a natural flexible mode data structure that allows easy access, storage, and manipulation of Java Beans.

The flexibility of the data structure in the repository model permits several types of association between the ManagedBean Elements and the Managed Beans. For instance, there can be a tree structure organization, in which the Managed Bean Elements of one Managed Bean are distinct from the Managed Bean Elements of another Managed Bean. Or, there can be a directed graph, in which there are distinct Managed Beans, but in which certain Managed Bean Elements belong to more than one Managed Bean. It is also the case that a set of Managed Bean Elements can be common to all Managed Beans in a repository.

Figure 3:
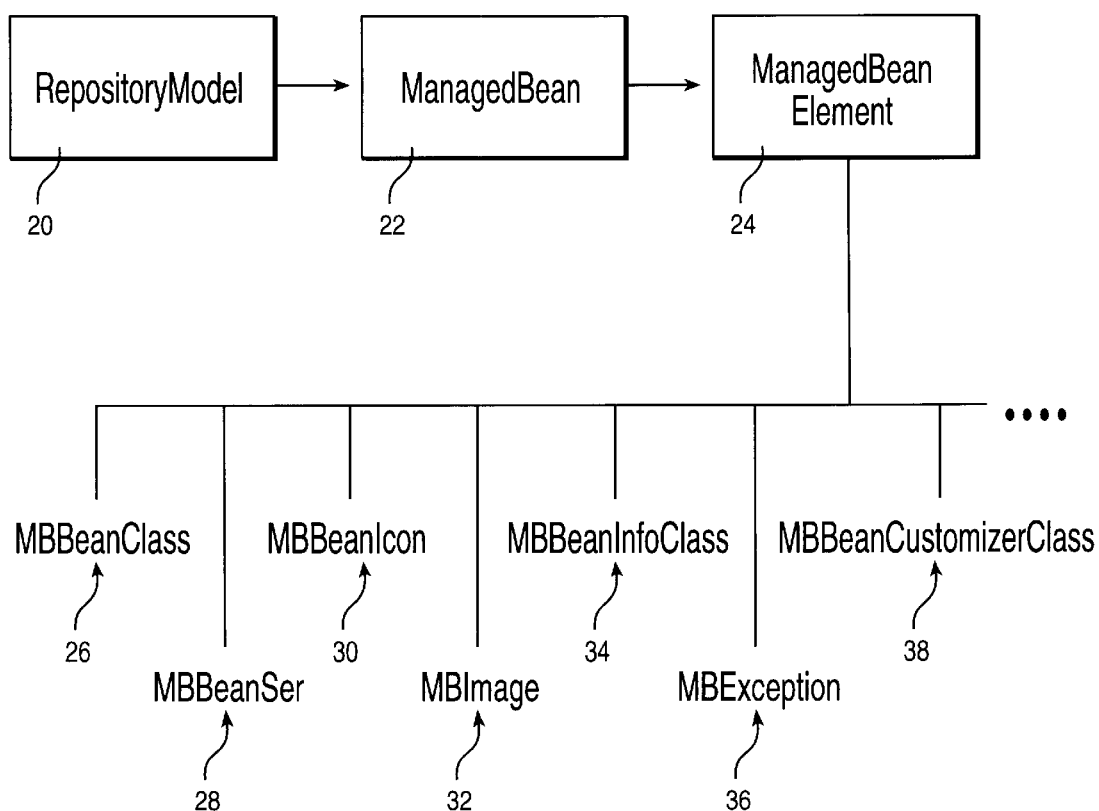
FIG. 3 is a detailed general container structure for storing Java Beans as disclosed in this invention.

Referring now to FIG. 3, there is shown a more rigorous description of the invention. A repository model 20 contains zero or more ManagedBeans 22. Each Managed Beans 22 contains zero or more ManagedBean Element classes (MBE) 26–38 which corresponds to a file (e.g., class, .ser, .jpg, etc.) that constitutes part of the Java Bean. Additionally, each ManagedBean Element class 26–38 is a subclass of the generic ManagedBean Element class 24. Each of these subclasses 26–38 serves to identify the different kinds of Bean sub-elements, and contains the data contained in the corresponding file, and methods that work upon this data. For example, the MBBeanCustomizerClass 38 contains a method to instantiate a Customizer and the MBBeanInfoClass 34 contains a method to instantiate a BeanInfo. While JAR files require the use of files to hold each Managed Bean Element, other forms of repository can store the Managed Bean Elements in other ways. Repositories are anticipated in which the Managed Bean Elements are kept in a source code control system, or within a database. Other repositories are anticipated in which the Managed Bean Elements are obtained across the Internet or an Intranet via a distributed repository operation.

Referring again to FIG. 3, each Managed Bean Element concrete class 26–38 implements the abstract methods of the Managed Bean Elements 24. Subclassing from the abstract superclass provides the polymorphic behavior useful to the programmer and tool writer. In this invention, the abstract class provides many methods for handling the Managed Bean Element. These include: get the type of the Managed Bean Element, get the type of the Managed Bean element as a string value, get the contents of the Managed Bean element as an array of bytes, write an array of bytes into the repository as the new contents of a Managed Bean element, and get or set properties of a Managed Bean Element, including the name.

Figure 4:
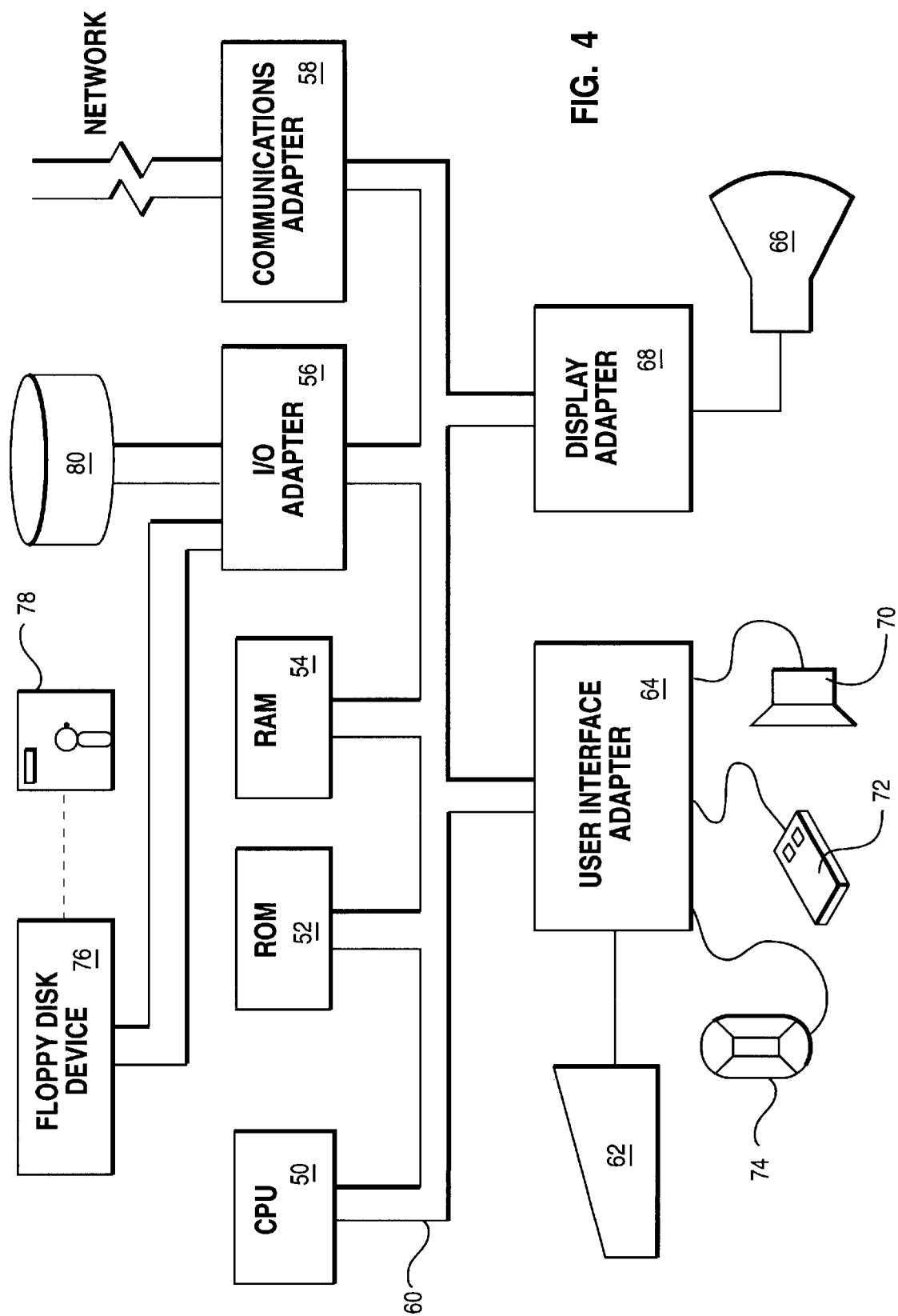
FIG. 4 is an illustrative embodiment of a computer system where the present invention may be practiced.

Referring now to FIG. 4, there is shown a pictorial representation of a workstation, having a central processing unit 50, such as a conventional microprocessor, and a number of other units interconnected via a system bus 60. The workstation shown in FIG. 4, includes a Random Access Memory (RAM) 54, Read Only Memory (ROM) 52, an I/O adapter 56 for connecting peripheral devices such as floppy disk unit 76 to the bus, a user interface adapter 64 for connecting a keyboard 62, a mouse 72, a speaker 70, a microphone 74, and/or other user interface devices such as a touch screen device (not shown) to the bus, a communication adapter 58, for connecting the workstation to a data processing network and a display adapter 68, for connecting the bus to a display device 66. The workstation, in the preferred embodiment, has resident thereon the computer software making up this invention, which may be loaded from diskette 78.

Figure 5:
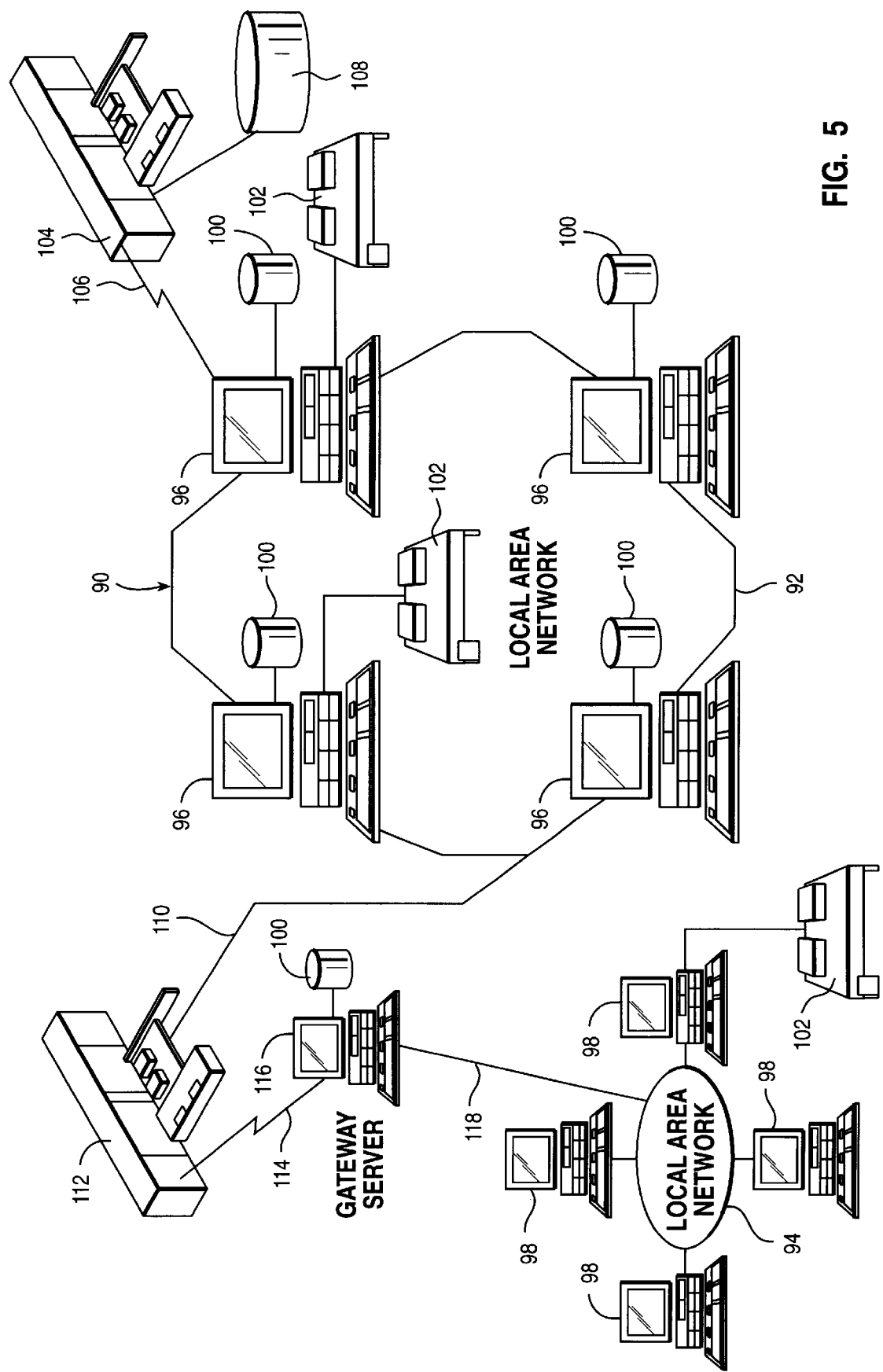
FIG. 5 is an illustrative embodiment of a computer network where the present invention may be practiced.

A representative network environment where this invention may be practiced is depicted in FIG. 5, which illustrates a pictorial representation of a distributed data processing system 90. As illustrated, data processing system 90 contains a plurality of networks, including local area networks (LAN) 92 and 94, each of which preferably includes a plurality of individual computers 96 and 98, respectively as shown in FIG. 4. One skilled in the art will appreciate that a plurality of workstations coupled to a host processor may be utilized for each such network. As is common in such data processing systems, each computer 96 and 98, may be coupled to a storage device 100, and a printer 102.

Data processing system 90 further includes one or more mainframe computers, such as mainframe computer 104, which may be preferably coupled to LAN 92 by means of a communication link 106. Mainframe computer 104 is preferably coupled to a storage device 108, which serves as remote storage for LAN 92. LAN 92 is also coupled via communications link 110 through communications controller 112 and communications link 114 to gateway server 116. Gateway server 116 is preferably a workstation which serves to link LAN 94 to LAN 92 via communications link 118. As understood by one skilled in the art, data processing system 90 additionally includes unillustrated gateways, routers, bridges, and various other network hardware utilized to interconnect the segments of data processing system 90.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A method, implemented in a computer system, for creating a storage container for a persistent collection of items, comprising the steps of:

storing an object-oriented object in said storage container accessible to a user in said computer system, said storage container having a plurality of related objects in a persistent state; and creating a collection of persistent files as a subclass of said object within said storage container wherein said persistent files represent different types of code and data for said object.

2. The method of claim 1 wherein said object contains a structured collection of code and data accessible by said user as a managed bean.

3. The method of claim 1 wherein said subclass identifies a different kind of object element accessible by said user as a managed bean element.

4. The method of claim 3, wherein said subclass contains data associated with said collection of files and methods that work on said data.

5. The method of claim 2 wherein said managed bean is written to a Java Archive file by the user in said computer system.

6. An apparatus for creating a storage container for a persistent collection of items, comprising:

means for storing an object-oriented object in said storage container accessible to a user in said computer system, said storage container having a plurality of related objects in a persistent state; and means for creating a collection of persistent files as a subclass of said object within said storage container wherein said persistent files represent different types of code and data for said object.

7. The apparatus of claim 6 wherein said object contains a structured collection of code and data accessible by said user as a managed bean.

8. The apparatus of claim 6 wherein said subclass identifies a different kind of object element accessible by said user as a managed bean element.

9. The apparatus of claim 6 wherein said subclass contains data associated with said collection of files and methods that work on said data.

10. The apparatus of claim 7 wherein said managed bean is written to a Java Archive file by the user in said computer system.

11. A computer program product having a computer readable medium having computer program logic recorded thereon for creating a storage container for a persistent collection of items, comprising:

computer readable means for storing an object-oriented object in said storage container accessible to a user in said computer system, said storage container having a plurality of related objects in a persistent state; and computer readable means for creating a collection of persistent files as a subclass of said object within said storage container wherein said persistent files represent different types of code and data for said object.

12. A computer program product of claim 11 wherein said object contains a structured collection of code and data accessible by said user as a managed bean.

13. A computer program product of claim 11 wherein said subclass identifies a different kind of object element accessible by said user as a managed bean element.

14. A computer program product of claim 11 wherein said subclass contains data associated with said collection of files and methods that work on said data.

15. A computer program product of claim 12 wherein said managed bean is written to a Java Archive file by the user in said computer system.

* * * * *